US011263585B2

(12) United States Patent
Lawler, Jr. et al.

(10) Patent No.: US 11,263,585 B2
(45) Date of Patent: Mar. 1, 2022

(54) SYSTEMS AND METHODS FOR ENVIRONMENTAL MONITORING OF SUPPLY CHAINS

(71) Applicant: Emerson Digital Cold Chain, Inc., Kennesaw, GA (US)

(72) Inventors: Casimir E. Lawler, Jr., Boise, ID (US); Blair Nygren, Jupiter, FL (US)

(73) Assignee: Emerson Digital Cold Chain, Inc., Kennesaw, GA (US)

(*) Notice: Subject to any disclaimer, the term of this patent is extended or adjusted under 35 U.S.C. 154(b) by 116 days.

(21) Appl. No.: 16/380,560

(22) Filed: Apr. 10, 2019

(65) Prior Publication Data
US 2019/0318302 A1    Oct. 17, 2019

Related U.S. Application Data

(60) Provisional application No. 62/656,836, filed on Apr. 12, 2018.

(51) Int. Cl.
*G06Q 10/08* (2012.01)
*H04W 4/80* (2018.01)

(52) U.S. Cl.
CPC ....... *G06Q 10/087* (2013.01); *G06Q 10/0832* (2013.01); *G06Q 10/0833* (2013.01); *H04W 4/80* (2018.02)

(58) Field of Classification Search
CPC ............. G06Q 10/087; G06Q 10/0833; G06Q 10/0832; H04W 4/80; H04W 4/02; H04W 4/35; H04W 4/38
See application file for complete search history.

(56) References Cited

U.S. PATENT DOCUMENTS

| 2004/0100380 | A1* | 5/2004 | Lindsay | G06K 19/0717 340/540 |
| 2005/0248455 | A1* | 11/2005 | Pope | G01K 1/024 340/539.27 |
| 2008/0121700 | A1 | 5/2008 | Dearing et al. | |
| 2009/0303052 | A1 | 12/2009 | Aklepi et al. | |
| 2011/0153469 | A1* | 6/2011 | Mackenzie | G06Q 10/087 705/28 |
| 2015/0037764 | A1 | 2/2015 | Minvielle | |

(Continued)

OTHER PUBLICATIONS

Written Opinion of the ISA regarding International Application No. PCT/US2019/026959 dated Aug. 2, 2019.

(Continued)

*Primary Examiner* — Vanel Frenel
(74) *Attorney, Agent, or Firm* — Harness, Dickey & Pierce, P.L.C.

(57) ABSTRACT

An environment monitoring method including measuring data from a plurality of sensors, wherein each of the plurality of sensors includes a unique identifier (UID). The method further includes instructing each of the plurality of sensors to measure data. The method also includes receiving the measured data from each of the plurality of sensors. The method then calculates a product degradation value of a product based on the measured data and compares the product degradation value with a threshold product degradation value. In response to the product degradation value of the product exceeding the threshold produce degradation value, the method generates and sends an alert to a device.

20 Claims, 8 Drawing Sheets

(56) References Cited

U.S. PATENT DOCUMENTS

| | | | |
|---|---|---|---|
| 2016/0249748 A1* | 9/2016 | Winters | G08B 21/182 |
| | | | 340/4.34 |
| 2017/0263100 A1* | 9/2017 | Johnston | F25D 29/008 |
| 2018/0284093 A1* | 10/2018 | Brown | H04W 4/35 |

OTHER PUBLICATIONS

International Search Report regarding International Application No. PCT/US2019/026959 dated Aug. 2, 2019.

* cited by examiner

SYSTEMS AND METHODS FOR ENVIRONMENTAL MONITORING OF SUPPLY CHAINS

CROSS-REFERENCE TO RELATED APPLICATIONS

This application claims the benefit of U.S. Provisional Application No. 62/656,836, filed on Apr. 12, 2018. The entire disclosure of the above application is incorporated herein by reference.

FIELD

The present disclosure relates to a product supply chain monitoring system, including a method for evaluating perishable product freshness.

BACKGROUND

Applications in food, chemical, and pharmaceutical supply chains exist for tracking items as well as the condition of the items. Product supply chains include vaccines, tissue samples, blood bags, chemicals, cosmetics, chocolates, fine wine, and genetically modified organism produce. In each of these cases, however, there is a need to track the products from bench to patient, precursors to product, and farm to fork, or bacteria to border.

In all cases, the challenge remains of tracking a wide and varied distribution of the early-stage, precursor products, through supply chain concentration, and back out through the three main distribution paths of retail, including: (i) location at which to purchase and consume elsewhere, (ii) location at which to purchase and consume there, and (iii) direct to home delivery. Additional challenges exist with respect to assessing the freshness of the product at each stage of the supply chain to determine if the product has been compromised.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An environment monitoring method including measuring data from a plurality of sensors, wherein each of the plurality of sensors includes a unique identifier (UID). The method further includes instructing each of the plurality of sensors to measure data. The method also includes receiving the measured data from each of the plurality of sensors. The method then calculates a product degradation value of a product based on the measured data and compares the product degradation value with a threshold product degradation value. In response to the product degradation value of the product exceeding the threshold produce degradation value, the method generates and sends an alert to a device.

An environment monitoring system comprising a plurality of sensors configured to measure data, wherein each of the plurality of sensors includes a unique identifier (UID). The system includes a reader configured to instruct each of the plurality of sensors to measure data and receive the measured data from each of the plurality of sensors. The system further includes a freshness assessment module. The freshness assessment module includes a freshness calculation module configured to calculate a product degradation value of a product based on the measured data and a freshness determination module configured to compare the product degradation value with a threshold product degradation value. The freshness assessment module also includes an alert generation module configured to generate and send an alert to a device in response to the product degradation value of the product exceeding the threshold produce degradation value.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

To monitor the quality of products delivered to consumers, a method for tracking the products from creation to delivery is presented. The products are tagged with sensors to monitor the environment of the product. For example, a sensor can be placed in the soil with a seed when it is first planted, monitoring the soil moisture, temperature, etc. A sensor can also be placed at each point along the supply chain of the product until delivery to a consumer to monitor all conditions to which the product is exposed. Readers are also placed throughout the supply chain to prompt sensors to conduct measurements of the environment. The readers may be sensors as well. All measured data is optionally transferred through the readers to a central storage location where historical product information can be indexed and stored.

Included in the historical information is qualitative information for a product. For example, using an application, an operator of a delivery truck can observe that a shipment of a product appears to be of medium freshness. The information input by the operator will include a timestamp. The historical information will then include the day at which the product loses a fresh appearance, which may affect the overall freshness that the consumer perceives. In this way, the historical information can be used to calculate a quantitative and qualitative analysis of the product and a product degradation threshold. The product degradation threshold can be compared to a current product degradation value of products in the supply chain. If a product in the supply chain is at risk of quantitatively or qualitatively falling below the threshold product degradation value for that particular product, operators along the supply chain will be alerted.

Once alerted, the operator can perform remedial actions to avoid additional loss. For example, if the operator is alerted when leaving a distribution center (DC) to deliver a product to a store that the product is below the threshold product degradation value, the operator may choose to not deliver the product as the store may reject delivery. In this way, the operator does not incur the additional cost of delivering a spoiled product.

Figure 1A:
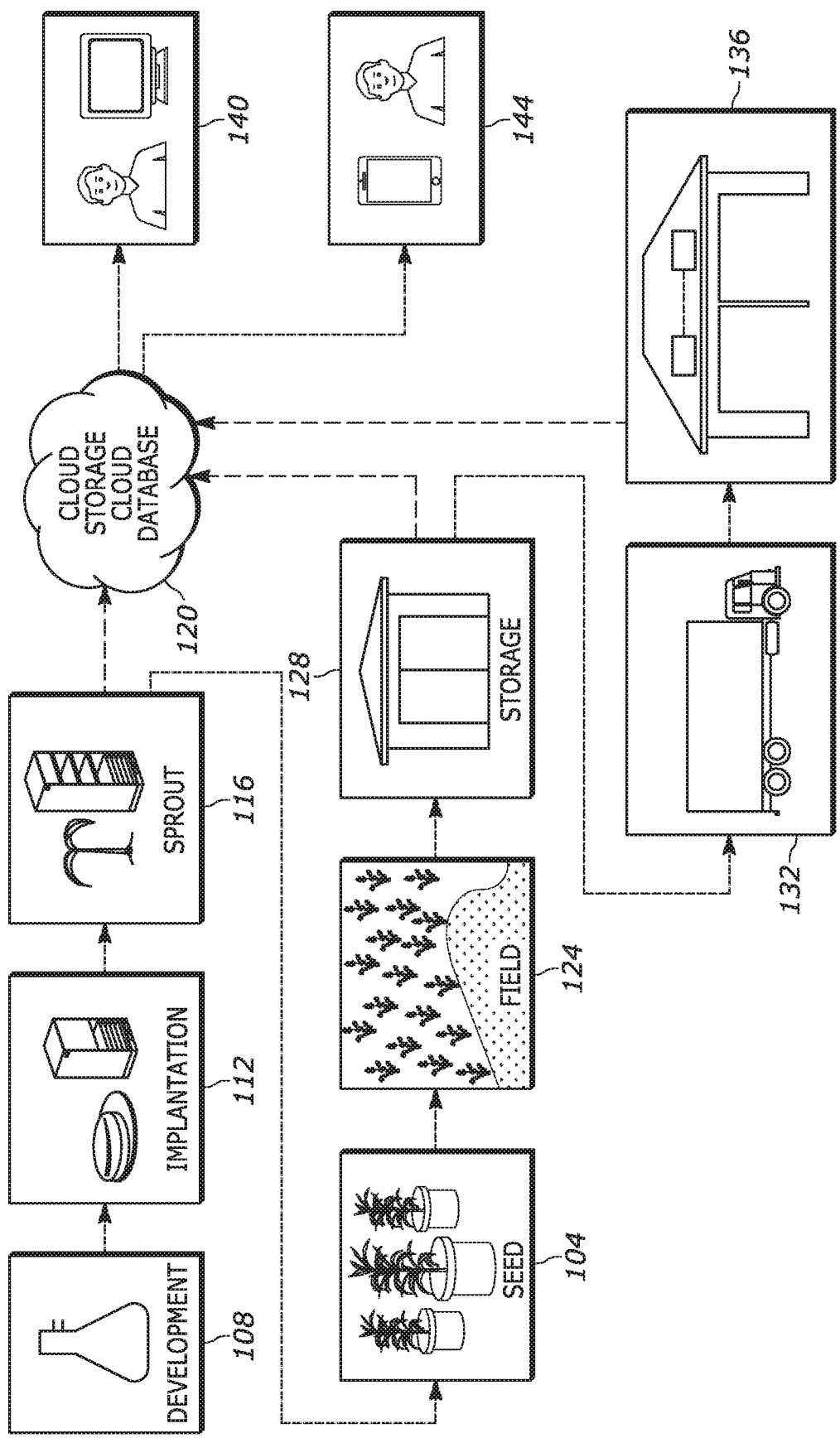
FIG. 1A is a graphical representation of an example implementation of monitoring a product from development to delivery.

Referring to FIG. 1A, a graphical representation of an example implementation of monitoring a product from development to delivery is shown. During a development cycle, a product begins in a food science lab. A seed 104 can be created in a laboratory. For example, in the food science lab for the product, ideal characteristics of the product are identified and samples are stored for testing and analysis. The samples may take the form of seeds, seedlings, or bacteria carrying the DNA of the desired characteristics. While many such labs use electronic laboratory systems (ELS) for storing notes and test results, few include scanners or cameras to collect tracking information or environment information from any sensors associated with a sample. While individual seeds may be staked or tagged with a sensor, each incubation chamber, growing chamber, and green house may be outfitted with a sensor and registered onto the system. Further, nearby a group of sensors is a reader capable of querying all of the sensors, retrieving measured data from the sensors, and sending the retrieved data to another reader or a central storage location. The chambers and sensors may have other information associated with them, such as location and maintenance records.

Figure 3:
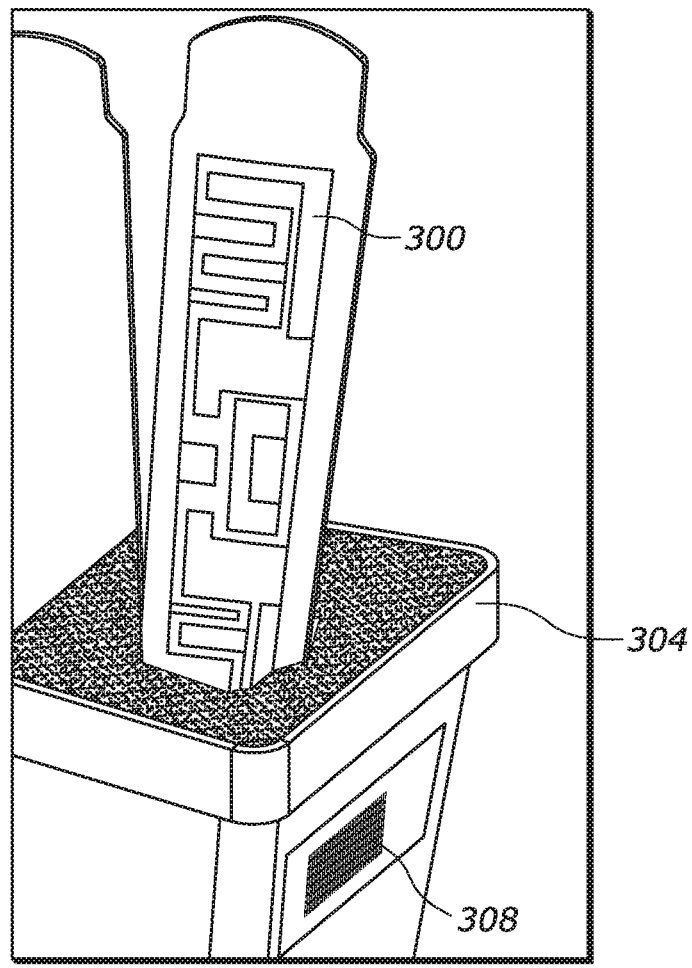
FIG. 3 is a graphical representation of an example implementation of a radio frequency identification (RFID) sensor.

Sensors are attached or associated with each stage of the development cycle and the product at each stage. The sensors are configured to measure environment data during each stage. Moreover, each sensor includes a unique identifier (UID), such as an EPC ID or EVRYTHNG ID. Each UID is attached to the sample or the container holding the sample, as seen in FIG. 3. For example, the UID may take the form of a printed or etched code, such as a QR, 2D, bar code, a radio frequency identification (RFID) tag, or a combination thereof, to track the seed 104 and eventually the product.

The sample can be transported from the laboratory to a greenhouse, a test field, and a production field. During the development cycle, the sample can be developed at the development stage 108, implanted at the implantation stage 112, and sprout 116 to create multiple seeds 104. The seed 104 can be referred to as a seedling and/or bacteria.

During the development cycle, the sample sprouts 116 into seedlings and may be split into multiple seeds 104. A sensor is attached to each seed 104 and each sensor is associated with the sample from when the sample was developed in the laboratory. In this way, the sample is tracked from creation, through the entire growth process, to delivery to a client. For example, once the seed 104 is planted, the seed 104 is tagged with a sensor and UID. After the seed 104 grows and is planted in the field 124, the UID of the seed 104 is associated with a corresponding row marker of the field 124. Once associated, all environment data gathered for the seed 104 before the seed 104 was planted in the row is associated with the row using the corresponding row marker. That is, environment data is transferred to each sensor along the development, growth, and delivery stages. In this way, whole fields may be traced back to a source and the environment conditions all along the way may be reviewed, analyzed, and stored to assist in the determination of best practices for the product, including environment conditions that are detrimental to freshness and the extent that the conditions are detrimental to freshness.

The measured environment data is uploaded to a cloud network 120 through the ELS, an application, or a web portal. Included in the UID may be data associated with the sample including a lot number location, reader information, site information, and environment conditions, as mentioned previously. The data associated with each UID may be collected manually, through a radio frequency (RF) query, or image processing. The data can be stored locally, at an offsite location, and/or in the cloud network 120. The data can be secured with a checksum type value in a blockchain configuration.

The environment data includes temperature data. The environment data can also include location information, relative humidity, and carbon dioxide levels. The sensors may be placed in the soil next to the product at each stage of the development cycle as well as placed in the soil of the seed 104 when the seed 104 is potted.

The seed 104 is planted in a field 124, and a field sensor is placed in the field 124 soil in a general location as well as with each seed 104. A sensor could further be placed at each row of the field 124. The field sensor measures the environment of the field 124. Once grown, the seed 104 has become a product and is harvested. The product is stored in storage 128. At each growth point, from the seed 104, the field 124, and storage 128, sensors can measure environment data and store the environment data at each stage in the cloud network 120.

After the product is stored in storage 128, the product is transported via a delivery truck 132 to a distribution center (DC) 136. Alternatively, the product can be transported via a train, a plane, a boat, or another transportation method to reach a DC 136, such as a store. The delivery truck 132 and the DC 136 also include sensors configured to measure the environment. The sensors can also upload environment data to the cloud network 120.

The environment data measured from sensors at each point from creation to delivery can be used to assess a product degradation value of the product. At each stage, the environment can compromise the freshness of the product. For example, if the product is stored in storage 128 at a particular temperature for an extended period of time, a shelf life of the product may be shortened. In this scenario, a storage operator can be notified of potential spoilage based on the product degradation value exceeding a threshold product degradation value. In this way, the storage operator may choose to no longer deliver the product if it is unlikely to arrive at the DC 136 in an acceptable freshness condition.

The storage operator can be alerted at a computer 140 or at a mobile device 144. The mobile device 144 may be any portable device including a screen, a processor, and a rechargeable battery. The computer 140 and/or the mobile device 144 receives an alert via the cloud network 120 of a condition where the product degradation value exceeds the threshold product degradation value.

Figure 1B:
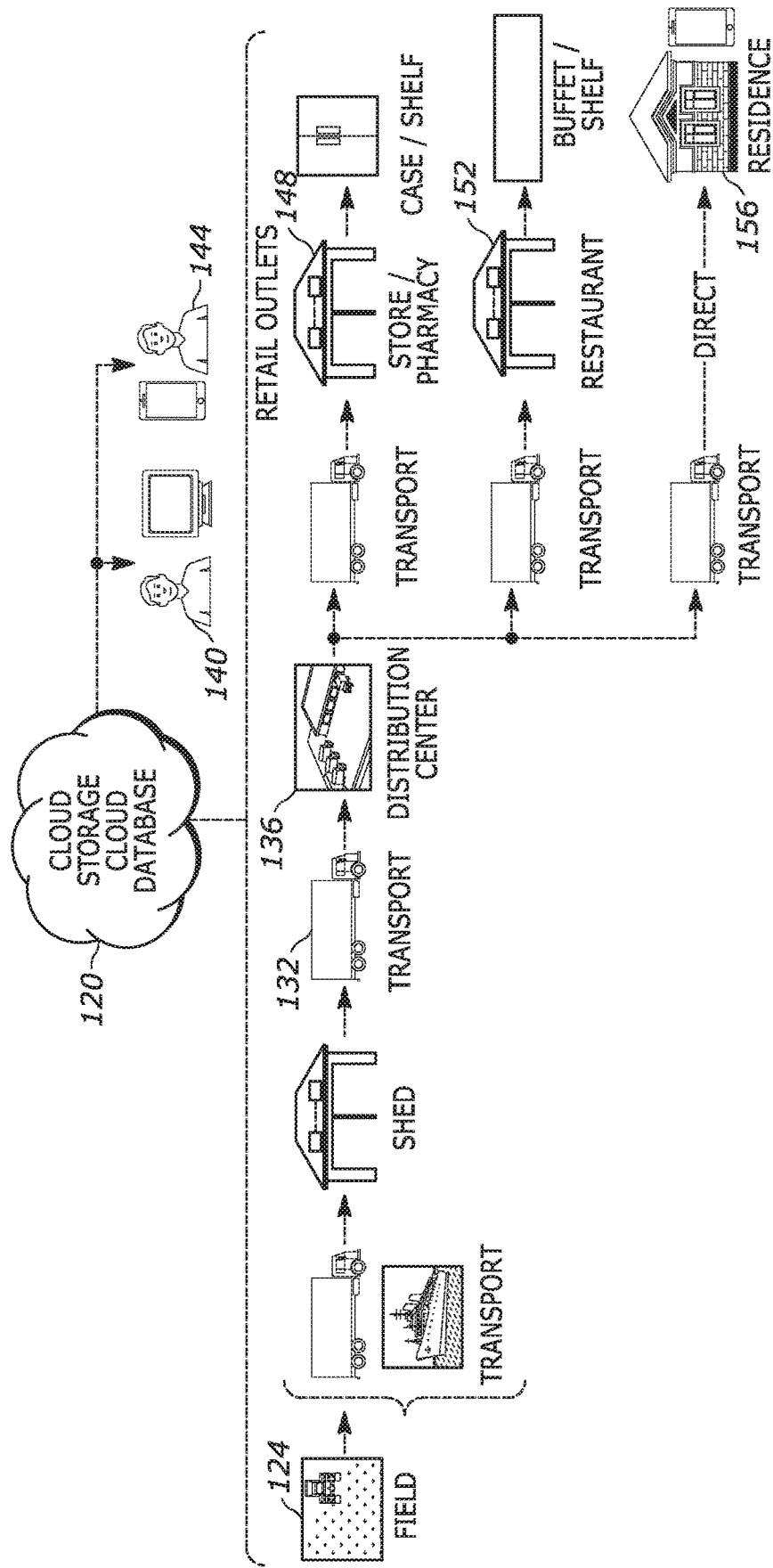
FIG. 1B is a graphical representation of an example implementation of monitoring a product from development to retail outlets.

Referring to FIG. 1B, a graphical representation of an example implementation of monitoring a product from development to retail outlets is shown. Similar to FIG. 1A, in various implementations, the product is grown in the field 124 and transported by the delivery truck 132 to the DC 136. The product may then be delivered to a variety of retail outlets. For example, the product may be delivered to a store 148 and placed on a shelf for consumer purchase. For further example, the product may be delivered to a restaurant 152 for consumer purchase. Additionally or alternatively, the product may be delivered directly to a residence 156 of a consumer. As depicted, the product is monitored at each stage of the supply chain. For example, the delivery truck 132 includes sensors to measure the environment of the product. The retail outlets may also include monitoring. As shown, transportation to the store 148, restaurant 152, or residence 156 may include cargo monitoring, for example, sensors attached to the transportation to measure environment data. Further, the store 148 or restaurant 152 may include facility monitoring, similar to the facility monitoring of the DC 136, to measure environment data when the product is stored at the retail outlets.

Figure 2:
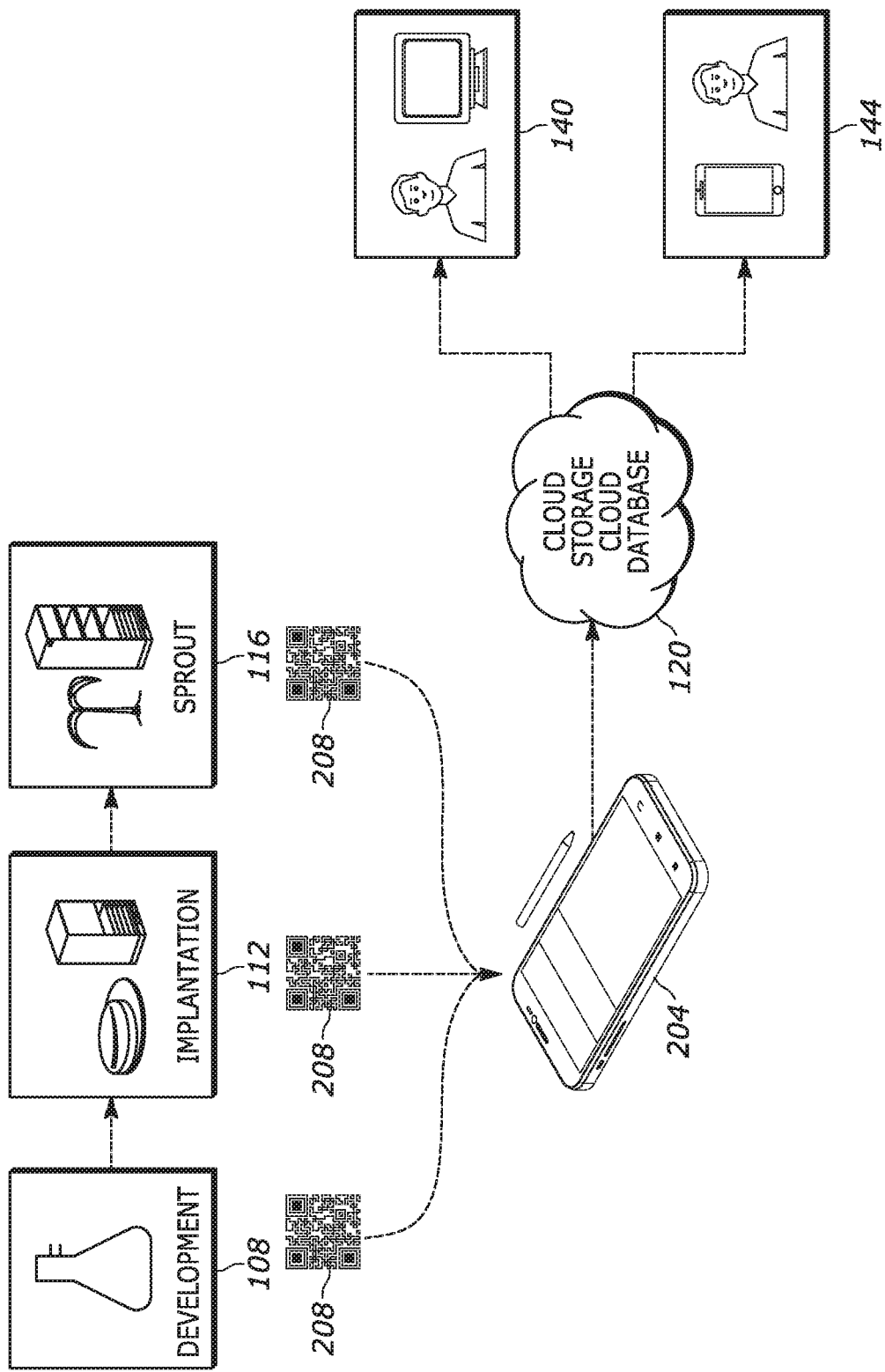
FIG. 2 is a graphical representation of an example implementation of monitoring a product during development.

Referring to FIG. 2, a graphical representation of an example implementation of monitoring a product during development is shown. As mentioned with respect to FIG. 1A, the product is tracked from creation through delivery. At the development stage 108, the sample has a sensor with a UID 208. The UID 208 identifies the product and all data associated with the product. That is, the environment conditions under which the product was created at the developmental stage 108 is measured by the sensor and associated with the UID 208 and stored in the cloud network 120. A product scanner 204 scans the UID 208 and associates the UID 208 with the laboratory. The product scanner 204 can scan the UID 208 at each step to associate the product with a location or another sensor. For example, the product scanner 204 scans the UID 208 of the seed 104 when the seed 104 is planted in the field 124 to associate all information measured by the sensor in the field 124 with the seed 104 and vice versa. In this way, when the seed 104 is harvested and stored in a container with multiple seeds, the container has a UID which associates all measured data of all the seeds in the container with the UID of the container. When the product is at the implantation stage 112, the sensor remains with the product and can be identified by the UID 208.

Referring to FIG. 3, a graphical representation of an example implementation of a sensor 300 is shown. The sensor 300 may be an RFID sensor. The sensor 300 is attached to a planted seed or the seed 104 of a product by being placed in the soil in which the product is growing. The product is planted in a container 304 and a UID 308 is attached to the container 304 identifying the product planted in the container 304. The sensor 300 includes an integrated circuit. The sensor 300 is passive and receives RF energy from a reader to power the integrated circuit and measure environment data once the integrated circuit is powered. The environment data may include, but is not limited to, a temperature, a relative humidity, a carbon dioxide level, and a location of the sensor 300. Once measured, the environment data is backscattered to the reader. The reader can upload the environment data to the cloud network 120. That is, the reader is a gateway through which the sensor 300 can transfer environment data to the network 120. In various implementations, the sensor 300 can independently transfer data to the cloud network 120.

Further, as the product moves from location to location, UIDs in the form of field row markers may be added. The UIDs of the products may be associated with the UIDs of the row markers to associated environment data about the experience of the product through the respective growth cycle, including temperature, soil moisture, soil nutrients, and general microclimates. The coordinates of each UID 208 of the product in the container 304 or on the field marker may be determined and added into the data collection and storage system. Location information may be collected at the time of planting in conjunction with the geocoordinates of the planter as seeds and row markers are inserted, or this information may be determined using the RSSI of RF tags, such as those using the EPC or Bluetooth protocols.

Figure 4:
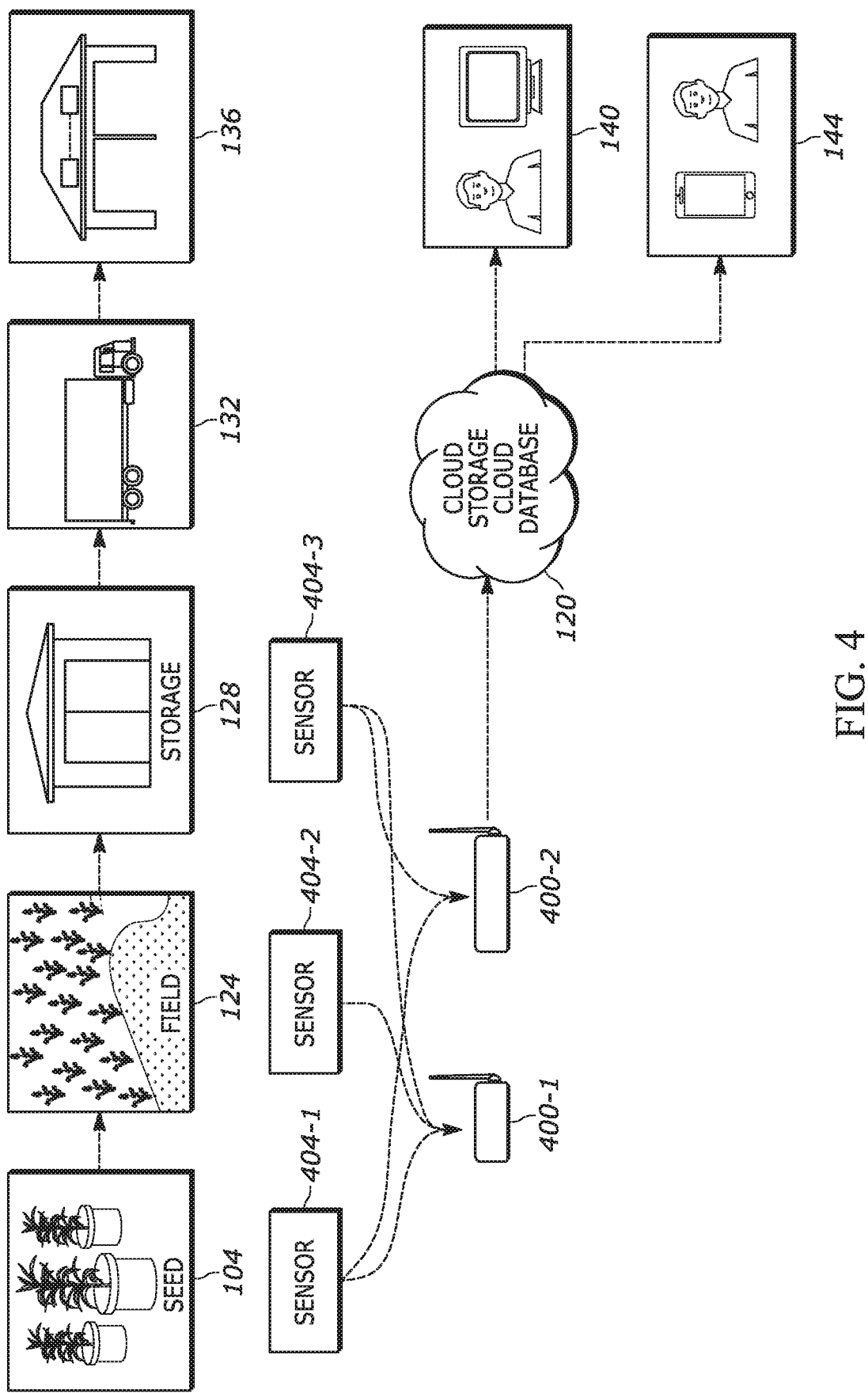
FIG. 4 is a graphical representation of an example implementation of monitoring a product from storage to the consumer using environment sensors.

Referring to FIG. 4, a graphical representation of an example implementation of monitoring a product from storage 128 to the consumer with environment sensors is shown. A reader 400-1 or 400-2, collectively readers 400, direct environment sensors 404-1, 404-2, 404-3, collectively 404, to measure environment conditions and send the measured data to the readers 400. Readers 400 can instruct sensors 404, which are passive, to measure and send data to the readers 400. Further, the readers 400 can include onboard sensors to measure environment conditions at the location of the readers 400. Similar to sensors 404, the readers 400 are each identified by a UID.

Readers 400 may be placed on the farming equipment to collect data from the sensors 404 during routine operations, as well as placed on posts throughout and to the side of the field 124. Such farming equipment includes a planter, a sprayer, and an irrigation pivot. Data from field and seed sensors may also be used to enhance the precision agriculture including water and nutrients, by feeding back information that may be used to control the content and flow of an individual spray head on either the spray-fertilizer machine or the irrigation pivot.

As the harvesting equipment collects the field product, readers 400 associate the product and field 124 row marker UIDs with the UIDs of large bins and/or bags into which the product is being collected. The readers 400 on the harvesting equipment also associate the UIDs and data of the harvesting equipment with the UIDs of the products and bins. As mentioned previously, each UID can be associated with another UID or data from another UID manually. That is, an operator can scan a UID and associate it with another UID using an application on a mobile computing device.

The bins and/or bags can be taken to storage 128, such as, a storage shed, for processing. The processing may include either cooling to remove the "field heat" in preparation for shipping, as with mushrooms or melons, or the processing may include storing this product for a period of time in an environmentally controlled facility, as with potatoes. Each storage facility may be outfitted with readers 400 and include a storage UID. The readers 400 in the storage facility may register the location and presence of any seed 104, field 124, or bin UID, and associate those UIDs with the UID of a particular storage space. This association may not only link storage temperature information from all the sensors 404 for the time the product is in that location but also any maintenance or support information for the facility. As with previous data collected along the supply chain, the collected data may be used to determine, monitor, and promote best practices in the supply chain. Given the location information that may be gathered using various RF techniques, three-dimensional facility monitoring may also be achieved when combining the available and associated data.

As in the field 124, in storage 128, and in the transfer of product in between, for example, by the delivery truck 132, the use of multiple readers 400, each with its own UID and associated information and sensors, and the abundant assignment of UIDs to spaces, containers, and products, with as many as possible having their own environment sensors, make it possible to continue to track the product as it is consolidated into cases throughout the supply chain. In this situation, UIDs may be assigned to cases and pallets of the product, with each larger group UID associated with its constituent UID while consolidated. These UIDs may be in the form of EPC Gen 2 or RAIN compliant RF inventory labels with sensors.

To assist in the monitoring of the sensors 404, slip sheets used between cases or pallets may be printed with an arrangement of RF antenna that may be driven by an attached antenna control box or reader. The attached box may be a stand-alone box, or a reading system integrated into the bin or pallet of product. The antennae on the slip sheet may be used individually or in a coordinated fashion such as an antenna array for improved reading performance.

Any delivery truck 132 used along the supply chain may be outfitted with a reader system, for example, one of the readers 400. The readers 400 may be of varying capabilities, such as those that are intended for case level reading, those for pallet level reading, and those for whole container level reading. The larger reader systems may reside in the trailer refrigeration system or in the motivator/cab. In both cases, the readers 400 may have an antenna or a number of antennae in the cargo area to read the UIDs either in RF or with image processing. The systems using multiple antennae may use standard antennae, or sheets of printed antennae similar to the slip sheet application. In the case of multiple antennae, the antenna may be operated either individually or in coordination as an antenna array.

In all situations, additional sensors may be assigned to these cargo spaces to monitor the air and wall temperatures of the environmentally controlled area. Along with information from the enclosed product sensors, a three-dimensional thermal map of the space may be generated. In this way, the sensors provide facility monitoring, trailer and trailer performance monitoring, yard monitoring, and asset tracking, as long as the reader is outfitted with a cellular or similar communications system.

Similarly, all readers 400 and all monitoring situations act in a "store and forward" fashion. Each reader 400 listens or polls for sensors 404 and UIDs, collects associated information, and then transmits the information to the data storage system, for example, the cloud network 120. While all readers 400 may act as gateways for other readers, readers running on line power may serve more often as gateways for other readers. In this way, readers may act either as loggers that record data and transmit information upon arrival at destination, or as real-time systems that update users via an application while in transit.

Through assigned and registered UIDs of pallets, this embodiment may be used to continue monitoring and tracking products through the supply chain, including into and through any number of DCs. Battery powered data loggers may be assigned UIDs and used in a shipment of product to monitor and record the environment conditions of the shipment. These sensors 404 may report their information through a gateway at the destination or a gateway in the shipping container, trailer, or delivery truck 132. Similarly, a consolidating reader may be included with product in a shipment to read and store the passive sensor information associated with the product of that shipment. Upon arrival at a destination, or in the presence of a gateway, or if equipped with an internal gateway and a communications link is successful, the consolidating reader may report their information to the cloud network 120.

Once at a DC, pallets and product is unloaded from the trailer or shipping container. As in the sheds, readers 400 located within a facility may be used to monitor the sensors 404 and UIDs of the product and track information such as the environment condition of the product, the location of the product within the facility, and the environment conditions of the facility. As the pallets are broken down, the readers 400 within the facility may monitor the UIDs and condition of the individual cases, and follow the product as it is rebuilt into pallets to be delivered to a particular site. As in the shed, pallets may be assigned UIDs and the UIDs of the product being placed on a given pallet may be read and associated with that pallet. A UID on the equipment or operator may also be read and associated with the pallet or product at that time in transit.

As pallets are being loaded onto the delivery truck 132 delivering product from the DC to the store, the UID of the delivery truck 132 and any internal sensors, and the UIDs of the pallets and products may all be associated. Similar to the delivery truck 132, trailer, or shipping container that delivered the product to the DC, the transport carrying the product in the retail distribution segment of the supply chain may be monitored and continue to monitor the product within the transport.

As with the DCs, upon arrival at the retail outlet, the readers 400 at the delivery doors may register the arrival of the delivery truck 132 and the contents, and associate their information in the data storage system. If the facility is outfitted with readers 400 and sensors 404 as is the DC, then the product may be tracked throughout the facility. If the facility is also outfitted with sensors 404 in the receiving area, the storage areas, and the retail display area and coolers, then facility and equipment monitoring information may be combined with site and product information in the data storage system. As in an outfitted DC, all data may be integrated and reviewed to optimize energy usage, predict maintenance or other issues, or determine best practices for the goals of the customer or site.

In the case of direct delivery, the readers 400 in the delivery truck 132 detect, monitor, and report on the products and environment conditions of the truck up until the time of delivery. The delivery person uses tool to enter and register when a product is delivered and may also make the last delivery entry for a product. The entry may include time, location, environment data, an image of the location, a signature, or biometrics of the person accepting the package.

If granted, the receiver, customer, or user may look up the history of a product based on the UID assigned to the product. The UID may be presented either in human or machine-readable form, and the user may use either a mobile application, a computer application, or a website. For security purposes, each of these data access points may require a login.

Throughout the supply chain, RAIN compliant passive sensors may be used to monitor facilities and equipment. These sensors have the added advantage of being G1 EPC compliant and compatible with a wide variety of currently available commercial inventory tracking systems. Such sensors, in the form of small tags and labels, do not require batteries, maintenance, may be readily mass produced, and may be affixed to a variety of surfaces. Equipment that may be monitored includes the cold cases in a grocery store, the buffet at a restaurant, or the hot boxes at concessions stands in a sports complex.

In various implementations, such as in an environment inhospitable to RF communications, sensors using Bluetooth low energy or other meshing RF protocol could be used to transfer information in a self-forming, self-healing network to a gateway.

For all sensors in relatively close proximity to each other, not all sensor information must be read at all reading intervals. For example, in the cases where temperature sensors are monitoring different parts of the same thermal mass, each sensor need only be read at half the thermal time constant, or less, of the mass to avoid temporal thermal aliasing of the data. In other words, as long as temperature measurements happen faster than a thermal body changes, the thermal state across the body may be sufficiently known at any time during monitoring. Similarly, increasing the number of sensors within a given thermal mass will improve special resolution of thermal events. The spacing between the sensors must be half the size of event to be observed, or smaller, to avoid spatial thermal aliasing. Interpolation and some extrapolation may be used to provide thermal boundaries in both space and time between sensors 404 and sensor reading. This applies to all thermal masses being measured, including pallets wherein cases have sensors 404, shipping containers wherein pallets have sensors 404, and rooms wherein pallets and cases of product are being monitored.

In various implementations where RF is used, cameras of phones, tablets, security, or application specific cameras may be used to monitor and track product throughout the supply chain. Cameras may be linked to systems programmed to (i) identify text, bar codes, QR codes, or other camera visible UID symbol system, (ii) interpret the symbols, and (iii) take action, such as send that information onto the data storage system. These symbols may include UID, product, source, carrier, destination, or environment information. For example, a camera may view a label with a UID and temperature sensitive element on the surface of the label, and determine the current temperature of the product due to color density or refraction or reflection of the image, and report that information to a cloud data system for process and alerting.

Analysis and alerting may be performed using the integrated data stored in the data storage system. Aside from analysis of shipment or events during the trip, supplier, carrier, and site analysis may be done for vendor grading or best practices. Equipment and use pattern analysis may be used for preventative maintenance and warranty analysis, as well as to optimize energy use and advise customers, users, and consumers.

Figure 5:
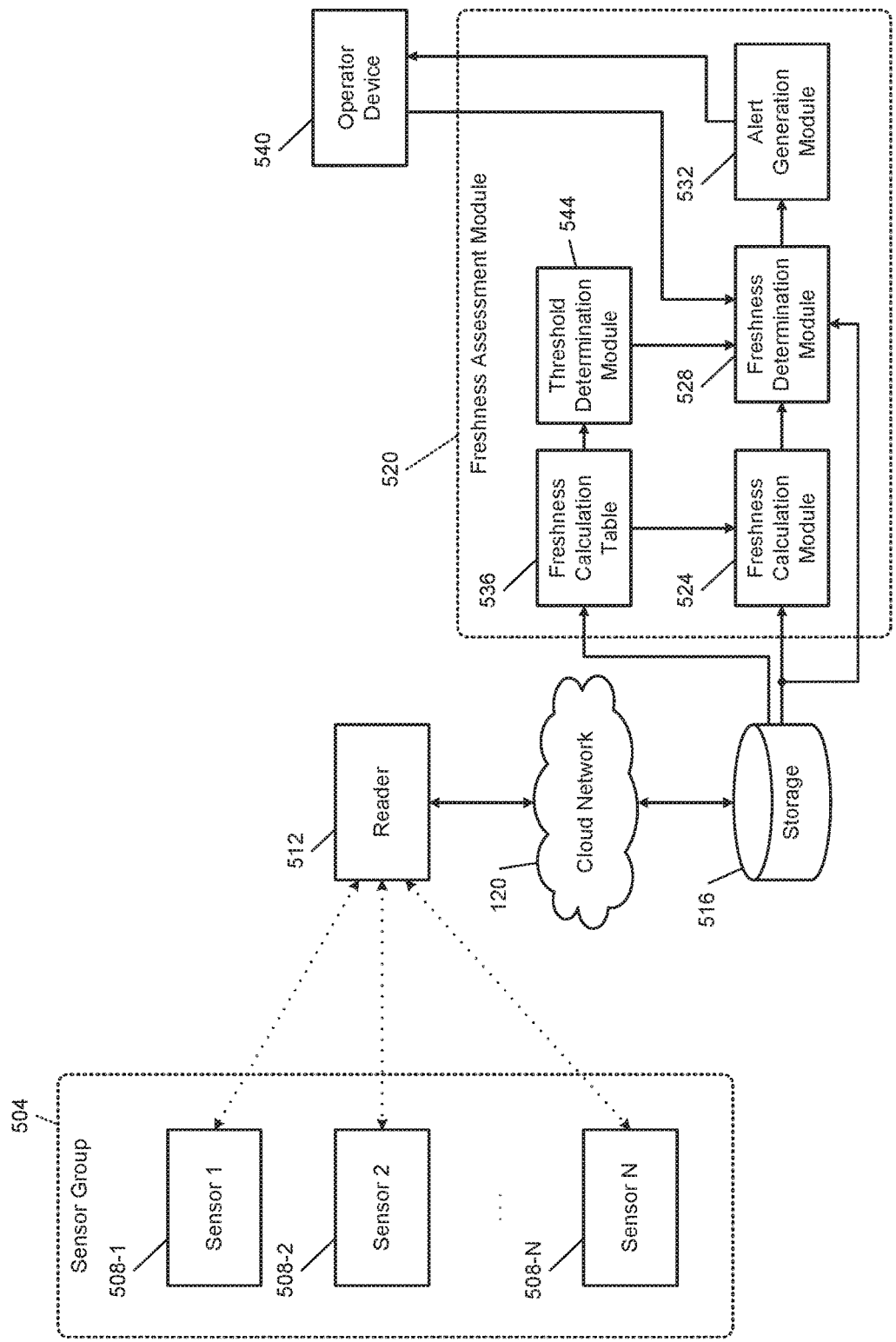
FIG. 5 is a functional block diagram of an example implementation of monitoring a product.

Referring to FIG. 5, a functional block diagram of an example implementation of monitoring a product is shown. A sensor group 504 includes a plurality of sensors, such as sensor 1 508-1, sensor 2 508-2, and sensor N 508-N, collectively sensors 508. The sensor group 504 is placed along a supply chain of a product. For example, sensor 1 508-1 is placed with the product when the product is first planted in a container, sensor 2 508-2 is placed on a bag of the product when the product is collected, and sensor N 508-N is placed on a delivery truck when the product is delivered. Additional sensors can be placed at different stages of the supply chain of the product.

A reader 512 is placed at intervals along the supply chain to instruct the sensors 508 to measure environment data and send the measured environment data to the reader 512. The environment data can include a temperature, a relative humidity, a carbon dioxide level, a vibration value, and a location. While one reader 512 is depicted in FIG. 5, readers can be placed along the supply chain as necessary to instruct the measuring of data and to receive the data. That is, readers may be placed at each location of the supply chain, proximate to the sensors 508 to instruct and power the sensors 508 as needed.

The reader 512 communicates via the cloud network 120 to store the measured environment data in a storage device 516. A freshness determination module 528 retrieves the measured environment data from the storage device 516. The storage device 516 may be located remotely or locally. In various implementations, the storage device 516 may be stored on a device with the freshness assessment module 520. The storage device 516 and the freshness assessment module 520 may also be located in the cloud network 120. In various implementations, the freshness assessment module 520 is implemented on a computing device, such as a computer, phone, tablet, etc. For example, the functions of the freshness assessment module 520 can be implemented through an application on the computing device.

The freshness assessment module 520 includes a freshness calculation module 524, a freshness determination module 528 and an alert generation module 532. The freshness calculation module 524 receives sensor data from the storage device 516. The freshness assessment module 520 can also include a freshness calculation table 536. The freshness calculation table 536 stores and organizes historical environment data for products.

For example, the environment data collected along each supply chain for products can be stored in the freshness calculation table 536 and can be compared to currently monitored products. That is, the freshness calculation table 536 can include historical sensor data for all products that are monitored in supply chains and the reader 512 can instruct the sensors 508 to measure the environment data at predetermined intervals. In this way, the freshness calculation module 524 can receive historical sensor data for each product from the freshness calculation table 536 as well as retrieve sensor data for actively monitored products to calculate a product degradation value for the monitored products.

In various implementations, the product degradation value can be calculated based on the Arrhenius equation used to calculate bacterial growth, shown below:

$$k = Ae^{-\frac{c}{RT}}$$

where k is a rate constant, A is a frequency factor or pre-exponential factor, $E_A$ is an activation energy, R is the gas constant, and T is temperature in kelvin. The Arrhenius equation indicates microbial growth based on time and temperature. Therefore, from the moment a product is harvested, the quality of the product and bacterial growth can be estimated.

For each product where environment data is collected, the Arrhenius equation can be modified based on the historical environment data stored in the freshness calculation table 536 to improve the accuracy of the bacterial growth calculation, thereby improving the accuracy of the product degradation value. Once the freshness calculation module 524 calculates the product degradation value of the product being tracked, the freshness determination module 528 compares the product degradation value to a threshold product degradation value for the particular product. The freshness determination module 528 determines whether the product degradation value has exceeded the threshold product degradation value, and, if so, the freshness determination module 528 sends an alert signal to the alert generation module 532 instructing the alert generation module 532 to generate and send an alert to an operator device 540.

The freshness calculation table 536 can also store user input for a tracked product. For example, an operator at a location along the supply chain can input qualitative data regarding the quality of the product. For example, via an application downloaded on the operator device 540, the operator can input information about the quality of the product. The information input by the operator can be stored in the freshness calculation table 536 and used to determination the threshold product degradation value. The operator device 540 may be a number of devices along the supply chain.

The freshness assessment module 520 can be implemented in real time or at predetermined times, such as arrival at a new location. For example, the freshness assessment module 520 may be implemented at a tracking facility where the product degradation value is calculated to ensure the quality of the product at each stage of the supply chain.

The freshness assessment module 520 also includes a threshold determination module 544. The threshold determination module 544 calculates the threshold product degradation value based on data included in the freshness calculation table 536. As mentioned previously, the freshness calculation table 536 includes both qualitative and quantitative data regarding tracked products.

In various implementations, the operator device 540 can request the freshness assessment module 520 determine the freshness of a product according to the most updated and available sensor data. For example, the operator device 540 can implement the freshness assessment module 520 via a freshness application where the implementation of the freshness assessment module 520 instructs the reader 512 to prompt the sensors 508 to measure the environment data. Once the freshness assessment module 520 reads the up-to-date environment data, the product degradation value is calculated and evaluated. In response to the product degradation value being below the threshold product degradation value, the alert generation module 532 will display the corresponding alert on the operator device 540.

In various implementations, the freshness assessment module 520 will regularly and automatically calculate the product degradation value. In response to the product degradation value being below or near the threshold product degradation value, the freshness assessment module 520 will send the corresponding alert to the operator device 540. For example, the alert generation module 532 will notify a client based on the location of the product as determined by the sensors 508.

The freshness assessment module 520 can send read requests to the reader 512 to determine whether to notify individuals along the supply chain of the quality and freshness of the product. Additionally, the freshness assessment module 520 can regularly send read requests to the reader 512 to retrieve interval environment data from the sensors 508 to add to the historical data included in the freshness calculation table 536.

Figure 6:
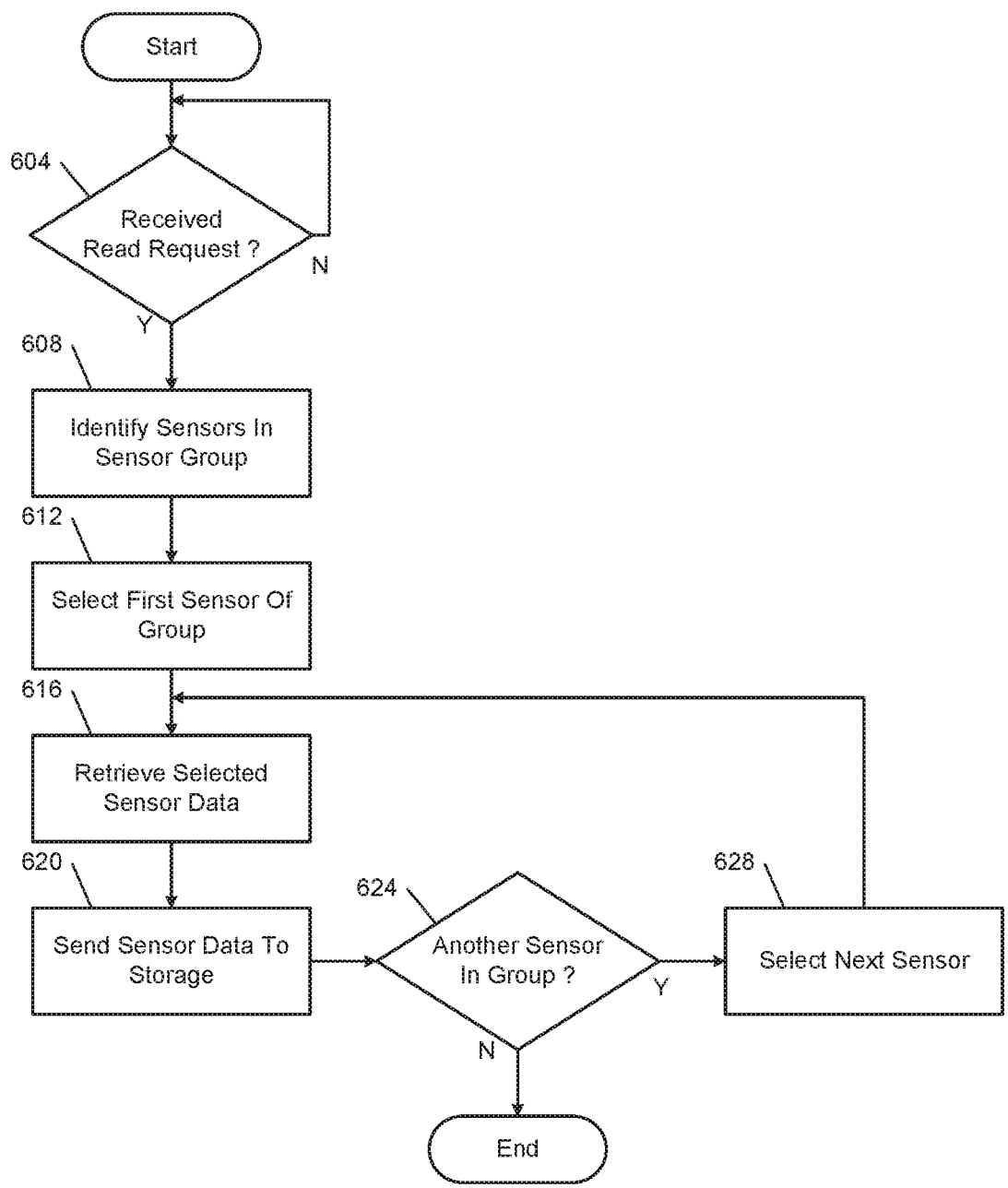
FIG. 6 is a flowchart of example control of a reader measuring data.

Referring now to FIG. 6, a flowchart of example control of a reader measuring data is shown. Control begins at 604, where the reader determines if a read request has been received from the freshness assessment module. As mentioned above, the freshness assessment module may regularly send read requests to the reader to add to the historical product environment database as well as to determine the product degradation value at the time the read request is sent. If the reader receives the read request at 604, control continues to 608. Otherwise, control waits to receive a read request.

At 608, the reader identifies all the sensors in the readable sensor group. Each reader has a predetermined number of sensors with which the reader can communicate. Once the reader receives the read request, the reader identifies the sensors in the sensor group. Control continues to 612, where the reader selects the first sensor in the sensor group, for example, sensor 1. Control continues to 616 where environment data is retrieved from the selected sensor. At 620, the retrieved sensor data is sent to the storage device. Control then determines at 624 whether another sensor is in the sensor group. If no, control ends. If there is another sensor in the sensor group, for example, sensor 2, control selects the next sensor in the sensor group and returns to 616 to retrieve environment data from the selected sensor. Once environment data is retrieved from each sensor and sent to the storage device, control ends.

Figure 7:
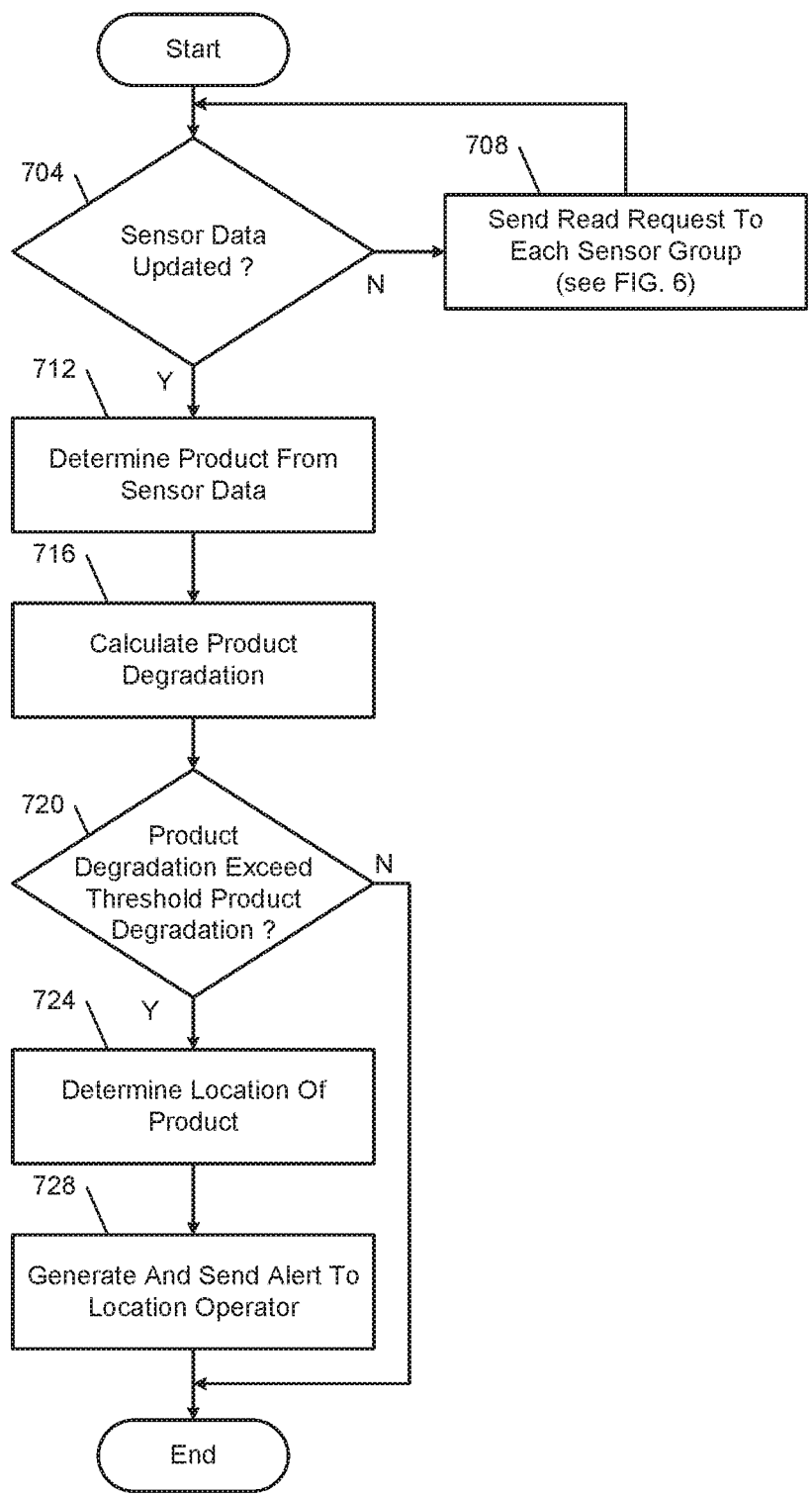
FIG. 7 is a flowchart of example control of freshness assessment of a product.

Referring now to FIG. 7, a flowchart of example control of freshness assessment of a product is shown. Control begins at 704 where the freshness assessment module determines if the sensor data is updated. That is, the freshness assessment module determines if the reader has instructed the sensors to measure environment data recently, for example, within the last ten minutes. If no, control continues to 708 where the freshness assessment module sends a read request to the reader, as illustrated in FIG. 6.

Once control determines that the sensor data is updated at 704, control continues to 712 to determine the product being tracked from sensor data. For example, control identifies the product from the UID of the sensors. Control continues to 716 where the freshness calculation module calculates the product degradation, for example, using the Arrhenius equation and the historical product data of the freshness calculation table. Control continues to 720 where control determines if the product degradation value exceeds the threshold product degradation. The threshold product degradation is calculated based on modification of the Arrhenius equation using historical product data. If the threshold product degradation is exceeded, control continues to 724 to determine a location of the product. Otherwise, control ends. For example, the location of the product can be determined from sensor data.

After the location of the product is determined, control continues to 728 to generate and send an alert to a location operator. That is, the alert is sent to the operator at the location of the product. In this way, the operator can determine whether the freshness has been compromised to the extent that the product will not be consumable or desirable by the end user.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An environment monitoring method comprising:
measuring data from a first sensor staked in soil of a container including an individual seed planted in the soil of the container and at least one of the container or the first sensor including a first unique identifier (UID) associated with the individual seed;
updating a table with the measured data from the first sensor, the table being indexed according to the first UID;
measuring data from at least one second sensor located in a field including a seedling grown from the individual seed and planted in the field at a field location associated with a field marker, the at least one second sensor including at least one second UID;
updating the table with the measured data from the at least one second sensor and to associate the first UID with the field marker, the table being indexed according to the first UID, the second UID, and the field marker;
measuring data from a plurality of third sensors at a plurality of locations for a product grown from the seedling over a period as the product is transported to a destination, wherein each of the plurality of third sensors includes a third UID;
updating the table with the measured data from the plurality of third sensors for the product over the period, wherein the table is further indexed according to the third UID of each of the plurality of third sensors and stores historical data for a plurality of products including the product;
determining a product degradation value of the product based on the measured data and historical data for the product stored in the table;
comparing the product degradation value with a threshold product degradation value;
generating an alert in response to the product degradation value of the product exceeding the threshold product degradation value; and
sending the alert to a device.

2. The method of claim 1 wherein the measured data of each of the plurality of third sensors includes: a temperature, a relative humidity, a carbon dioxide level, and a location of each of the plurality of sensors.

3. The method of claim 1 further comprising storing the measured data of each of the plurality of third sensors in a remote data storage.

4. The method of claim 3 further comprising transferring the measured data to the remote data storage via a reader, wherein the reader is configured to measure: a temperature, a relative humidity, a carbon dioxide level, a location, and vibration.

5. The method of claim 1 further comprising indexing the measured data by product on a freshness calculation table, wherein the plurality of third sensors are located in proximity to the product to trace the product along a supply chain.

6. The method of claim 5 further comprising accessing the freshness calculation table to calculate the product degradation value.

7. The method of claim 1 wherein the plurality of third sensors are passive radio frequency identification sensors, and wherein a reader supplies power to the plurality of third sensors in response to transmitting a read request to the reader.

8. The method of claim 1 further comprising:
determining a location of the product;
determining an operator device associated with the location; and
sending the alert to the operator device associated with the location.

9. The method of claim 1 wherein the threshold product degradation value is determined from a freshness calculation table.

10. The method of claim 1 wherein the first UID is included in a radio frequency identification (RFID) tag, and wherein, to monitor the product along a supply chain of the product, the first UID is located in at least one of: (i) a shipping container, (ii) a trailer, and (iii) a cold room.

11. An environment monitoring system comprising:
a first sensor staked in soil of a container and configured to measure data associated with an individual seed planted in the soil of the container, at least one of the container or the first sensor including a first unique identifier (UID) associated with the individual seed;
at least one second sensor located in a field including a seedling grown from the individual seed and planted in the field at a field location associated with a field marker, the at least one second sensor including at least one second UID;
a plurality of third sensors configured to measure data at a plurality of locations for a product grown from the seedling over a period as the product is transported to a destination, wherein each of the plurality of third sensors includes a third UID;
a reader configured to update a table with the measured data from the plurality of third sensors for the product over the period, the tables storing measured data from the first sensor and the at least one second sensor and being indexed according to the first UID, the second UID, and the field marker, and configured instruct the plurality of third sensors to measure data associated with the product, and receive the measured data from the plurality of third sensors; and
a freshness assessment module including:
a freshness calculation module configured to determine a product degradation value of the product based on the measured data and historical data for the product stored in the table;
a freshness determination module configured to compare the product degradation value with a threshold product degradation value; and
an alert generation module configured to generate and send an alert to a device in response to the product degradation value of the product exceeding the threshold product degradation value.

12. The system of claim 11 wherein each of the plurality of third sensors measures data including: a temperature, a relative humidity, a carbon dioxide level, and a location of each of the plurality of sensors.

13. The system of claim 11 wherein the freshness assessment module is included in the reader.

14. The system of claim 11 wherein the reader is further configured to measure data including: a temperature, a relative humidity, a carbon dioxide level, a location, and vibration.

15. The system of claim 11 further comprising a freshness calculation table indexing the measured data by product, wherein the plurality of third sensors are located in proximity to the product to trace the product along a supply chain.

16. The system of claim 15 wherein the freshness calculation module accesses the freshness calculation table to calculate the product degradation value.

17. The system of claim 11 wherein the plurality of third sensors are passive radio frequency identification sensors, and wherein the reader supplies power to the plurality of third sensors in response to the freshness assessment module transmitting a read request to the reader.

18. The system of claim 11 wherein the alert generation module:
   determines a location of the product;
   determines an operator device associated with the location; and
   sends the alert to the operator device associated with the location.

19. The system of claim 11 wherein the threshold product degradation value is determined from a freshness calculation table.

20. The system of claim 11 wherein the first UID is included in a radio frequency identification (RFID) tag, and wherein, to monitor the product along a supply chain of the product, the first UID is located in at least one of: (i) a shipping container, (ii) a trailer, and (iii) a cold room.

* * * * *